Figure 1:
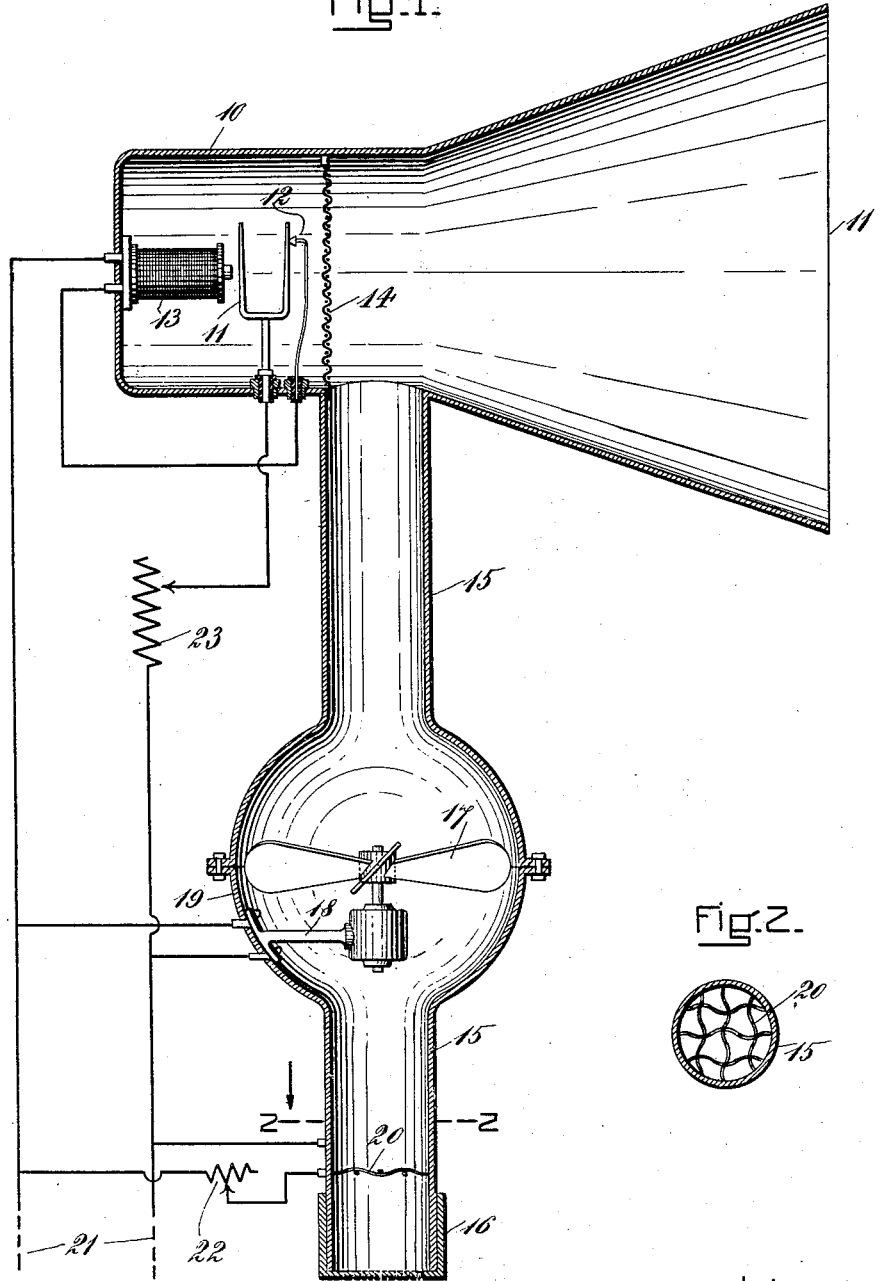

May 26, 1931.  H. N. SWEET  1,807,076
INSECT EXTERMINATOR
Filed Oct. 16, 1930

INVENTOR:
Henry N. Sweet
By Geo. K. Woodworth
ATTORNEY:

Patented May 26, 1931

1,807,076

UNITED STATES PATENT OFFICE

HENRY N. SWEET, OF BOSTON, MASSACHUSETTS

INSECT EXTERMINATOR

Application filed October 16, 1930. Serial No. 489,063.

My invention relates to a method of and an apparatus for exterminating insects such as mosquitoes and the like, which by the vibration of their wings produce notes of approximately constant and ascertainable pitch.

My invention comprises the creation and radiation of sound waves approximating in pitch that of the note produced by the vibrating wings of the insects sought to be exterminated, thereby attracting the same to the vicinity of the sound producer, and then drawing them by suction into a receptacle. An incinerating device such as an electric grid preferably, although not necessarily, is interposed between the suction device and the receptacle.

The drawings which accompany and form a part of this specification illustrate an arrangement of apparatus and circuits embodying my invention.

In the drawings—

Figure 2:
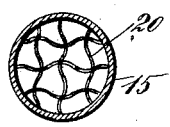

Figure 1 is a longitudinal section of an insect exterminator whereby my improved method may be practiced; and Fig. 2 is a transverse section taken on the line 2—2 of Fig. 1.

In the particular drawings selected for more fully disclosing the principle of my invention, 10 is a housing having an inlet opening 11 shown in the present instance as a hollow truncated cone. Disposed within said receptacle is a sound producer which may be of any type which will create and radiate sound waves having a pitch approximating the note produced by the vibrating wings of insects. In the present instance the particular type of sound producer illustrated is an electrically controlled tuning fork 11, one prong of which is normally in contact with the back contact 12 and the other disposed in proximity to the actuating electromagnet 13. Preferably a screen 14 is interposed between the sound producer and the inlet opening of the housing.

Communicating with said housing is an outlet conduit 15 having a perforate receptacle 16 detachably secured to the lower end thereof and enclosing, intermediate said receptacle and inlet opening, any suitable means such as the electric fan 17 for creating a current of air through said inlet opening and conduit. In the present instance the electric fan is shown mounted on the bracket 18 which in turn is secured in any suitable manner to the enlarged portion 19 of said conduit.

An electric grid 20 may be interposed between the inlet opening and the receptacle 16 to incinerate the insects drawn pneumatically into said receptacle.

The sound producer, fan and grid may be connected in shunt to the lighting circuit 21, and preferably the adjustable resistances 22 and 23 are inserted in the circuits of the grid and sound producer to regulate the volume of current energizing the same.

It is a well known fact that humming insects are attracted by notes having substantially the same pitch as the sound which they produce. Insects so attracted by the note produced by the sound producer 11 will be drawn into the conduit by the air current produced by the fan 17 and thus forced into the receptacle 16 where they may be destroyed, if the grid is not employed, or burned up on their passage to said receptacle, if said grid is used.

Having thus disclosed my improved method, and an illustrative embodiment of a simple apparatus whereby said method may be practiced without however, limiting my invention thereto, what I claim and desire to secure by Letters Patent is:

1. The method of exterminating insects which consists in creating and radiating sound waves having a pitch approximating that of the note produced by the vibrating wings of said insects, and pneumatically drawing the insects attracted by such radiated sound waves into a receptacle.

2. An insect exterminator comprising in combination a housing having an inlet opening, a sound producer for creating and radiating sound waves having a pitch approximating that of the note produced by the vibrating wings of insects, said sound producer being disposed within said housing, an outlet conduit communicating with said housing, a receptacle connected to said conduit, and means for creating a current of air through said inlet opening and conduit, said means being interposed between said inlet opening and said receptacle.

In testimony whereof, I have hereunto subscribed my name this 15th day of October, 1930.

HENRY N. SWEET.